United States Patent [19]

Shand et al.

[11] Patent Number: 6,147,976
[45] Date of Patent: Nov. 14, 2000

[54] FAST NETWORK LAYER PACKET FILTER

[75] Inventors: Ian Michael Charles Shand, Cobham, United Kingdom; John Anthony Harper, Valbonne, France; Steven Richard Welch, Camberley, United Kingdom

[73] Assignee: Cabletron Systems, Inc., Rochester, N.H.

[21] Appl. No.: 08/670,733

[22] Filed: Jun. 24, 1996

[51] Int. Cl.[7] .............................. H04L 12/28; H04L 12/66
[52] U.S. Cl. ........................... 370/254; 370/392; 370/401
[58] Field of Search .................................. 370/389, 390, 370/400, 401, 402, 403, 404, 405, 407, 408, 410, 392, 254, 466, 467; 379/219, 220; 395/200.01, 200.02, 200.03, 200.06, 200.1, 200.17, 828, 829, 831, 186, 187.01; 709/230, 231, 236, 238, 246, 249

[56] References Cited

U.S. PATENT DOCUMENTS

| | | | |
|---|---|---|---|
| 5,136,580 | 8/1992 | Videlock et al. | 370/403 |
| 5,313,465 | 5/1994 | Perlman et al. | 370/254 |
| 5,327,426 | 7/1994 | Dolin, Jr. et al. | 370/235 |
| 5,425,026 | 6/1995 | Mori | 370/410 |
| 5,455,865 | 10/1995 | Perlman | 380/49 |
| 5,475,823 | 12/1995 | Amerson et al. | 395/496 |
| 5,519,858 | 5/1996 | Walton et al. | 395/610 |
| 5,590,285 | 12/1996 | Krause et al. | 395/200.2 |
| 5,617,421 | 4/1997 | Chin et al. | 370/402 |
| 5,619,498 | 4/1997 | Sharpe | 370/396 |
| 5,623,601 | 4/1997 | Vu | 395/187.01 |
| 5,644,571 | 7/1997 | Seaman | 370/401 |
| 5,657,314 | 8/1997 | McClure et al. | 370/401 |
| 5,802,043 | 9/1998 | Skillen et al. | 370/258 |

*Primary Examiner*—Chi H. Pham
*Assistant Examiner*—Kwang B. Yao
*Attorney, Agent, or Firm*—Wolf, Greenfield & Sacks, P.C.

[57] ABSTRACT

A new packet filtering system associates domain identifiers with respective sets of addresses. A set of domain prefixes defines the set of addresses associated with a given domain identifier. Domain prefixes are found matching the source address and destination address of each received packet. These prefixes are associated with a source domain identifier and destination domain identifier respectively. The system similarly associates sets of one or more protocol types and port ranges with respective protocol domain identifiers. The protocol type, source port and destination port of the received packet determine source and destination protocol domain identifiers for the received packet. The system includes a filtering matrix including one or more entries, each indicating whether an associated received packed should be filtered. The source domain identifier, destination domain identifier, and source and destination protocol domain identifiers are used to index into the filtering matrix, for example using each as an index into one of the dimensions of a four dimensional array used to implement the filtering matrix. In an alternative embodiment, the source and destination protocol identifiers are used to obtain a protocol index from a protocol vector data structure. The protocol index, source domain identifier and destination identifier are then used to index into a three dimensional filtering matrix. The system further optimizes the filtering matrix for size, and the lookup time is dependent only on the number of filtering domains, and not the complexity or number of filtering rules.

19 Claims, 7 Drawing Sheets

FAST NETWORK LAYER PACKET FILTER

FIELD OF THE INVENTION

The disclosed invention relates generally to computer network security, and more specifically to a system for filtering packets received by a packet forwarding device.

BACKGROUND

Computer networks such as local area networks (LANs) today provide internal communication within virtually all types of organizations. Recently, local area networks have been connected together into what are known as "internetworks". Internetworks provide communication between administratively distinct organizations, linking businesses, schools, and government agencies. Unfortunately, internetworks create security problems that cannot be solved with existing mechanisms used within individual organizations, such as restricting physical access to host systems. In particular, interconnection of local area networks at the datagram level is an "all or none" mechanism, allowing outsiders access to all resources on an organization's network. Where this type of interconnection is provided, in order to avoid penetration into the organization's computer systems, every host within the organization must be individually secured. Such security measures are extremely costly when tens of thousands of workstations are in use within the organization. Accordingly, network administrators need a generalized system to restrict inter-organization access to hosts and applications within their organization.

One example of a packet forwarding device used to connect multiple local area networks into an internetwork is a "router" (also referred to as a "gateway"). Existing network layer routers are based on the internet protocol (IP) suite. All datagrams in an IP internetwork carry an IP header, which includes source and destination host addresses. Data is carried by transport protocols layered above the IP layer. Common transport protocols include the Transport Control Protocol (TCP), and the User Datagram Protocol (UDP). To provide network security, network administrators for an organization desire to restrict the use of such higher level protocols through each gateway connecting the organization with the internet.

The TCP and UDP protocols incorporate the concept of a "port", identifying an end point of a communication path. In some cases network managers desire the ability to restrict access to specific ports of systems within their organization.

Various specific approaches have been used to protect an organization's network from unwanted internetwork connections by blocking connections in gateways. One existing approach is to remove routing table entries in each gateway that defines routes to specific external networks, thus making it impossible for a local host to send packets to those external networks. Since most protocols require some bi-directional packet flow, breaking the route in one direction is usually sufficient to prevent formation of a connection. However, this approach does not allow the network administrator to permit access to some local hosts but not others.

Other existing packet filtering systems parse the headers of received packets and apply filtering rules directly from a simple set of rules input by the network administrator to determine whether to route or drop the packet. In existing systems, the header fields used to filter the received packets include packet type (TCP, UDP, etc.), source IP address, destination IP address, as well as source and destination TCP/UDP ports.

In addition to the information contained in the headers, some existing gateway filtering systems allow a network administrator to specify rules that determine whether a packet should be filtered based in part on which router interface the packet is destined to go out on, and others allow rules based on which interface the packet came in on.

Filtering rules are expressed in existing systems as a table of conditions and associated actions which are applied to each received packet in a predetermined order until a decision to route or drop the packet is reached. Each row in the table contains the conditions specified by a single rule and whether or not to drop a packet which meets those conditions. When a particular packet meets all the conditions specified by a given row of the table, the packet is either dropped or forwarded, according to the action specified in the row. Such exhaustive searching of the rule table is time consuming and reduces gateway performance.

Thus there is needed a new system for packet filtering which does not require a search through individual rules in a packet filtering database for each received packet. The new system should also not require removal of routes to specific external networks from network routing tables. And the new system should permit filtering based on both source and destination TCP/UDP ports.

SUMMARY OF THE INVENTION

In accordance with principles of the invention, there is provided a new packet filtering system. The new packet filtering system associates a number of domain identifiers with a respective set of network layer addresses. This relationship is maintained in a preformed address table or tables. The address table entries each have a domain prefix and a domain identifier associated with that prefix.

Each received packet contains a destination address and a source address, for example network layer addresses. A domain prefix is found that matches the source address, as well as a domain prefix matching the destination address. These prefixes are associated with the source domain identifier and the destination domain identifier respectively. In this way a source domain identifier and destination domain identifier are obtained reflecting the information found in the received packet header.

The system similarly forms one or more protocol tables which form an association between sets of one or more ports within protocol types and respective domain identifiers. The protocol type, source port and destination port of the received packet are used to find entries in a protocol table corresponding with the source port and destination port of the received packet. The entries in the protocol table corresponding with the source port and destination port of the received packet indicate a source protocol domain identifier and a destination protocol domain identifier respectively for the received packet. In an example embodiment, the source protocol domain identifier and destination protocol domain identifier are used to index into a protocol vector data structure, which contains a single protocol index for each possible combination of source protocol identifier and destination protocol identifier.

The system forms a filtering matrix including one or more entries. Each filtering matrix entry includes a forwarding flag. The value of the forwarding flag determines whether the received packet should be forwarded or dropped. The source domain identifier, destination domain identifier, and protocol index are used to index into the filtering matrix, for example using each as an index into one of the dimensions of a three dimensional array used to implement the filtering matrix. The forwarding flag in the entry referenced by indexing into the filtering matrix using the source domain identifier, destination domain identifier, and protocol index determines whether the received packet should be forwarded or dropped. The system also includes an advantageous system for generating and forming the packet filtering data structures including the filtering matrix.

In this way the disclosed system provides packet filtering which does not require an exhaustive search of all individual rules in a packet filtering database for each received packet. The disclosed system does not require removal of routes to specific external networks from gateway routing tables. The disclosed system further permits filtering based on both source and destination TCP/UDP ports.

BRIEF DESCRIPTION OF THE DRAWINGS

These and other features and advantages of the present invention will become apparent from a reading of the detailed description of the preferred embodiments in conjunction with the attached drawings in which like reference numerals refer to like elements in the several views.

DETAILED DESCRIPTION OF THE PREFERRED EMBODIMENTS

Figure 1:
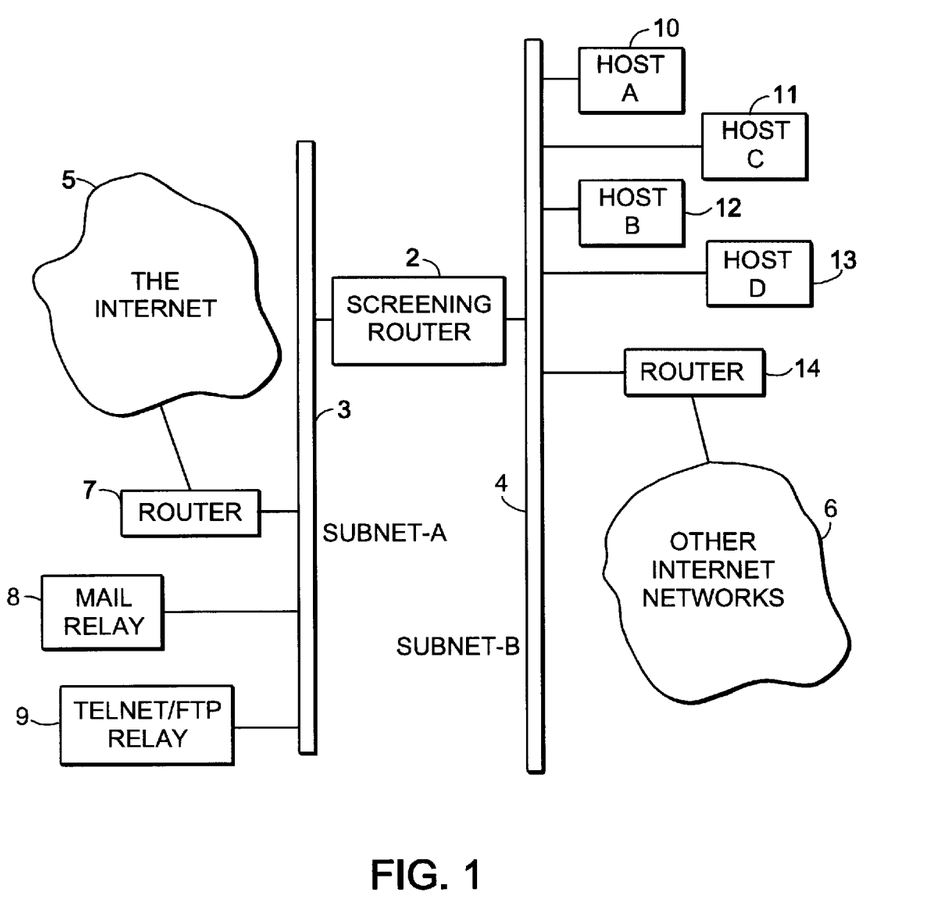
FIG. 1 shows an example network topology including a screening router used to filter packets between a first subnet and a second subnet.

FIG. 1 shows an example network topology including a Screening Router 2 coupled to a Subnet A 3 and a Subnet B 4. Subnet A 3 and Subnet B 4 are for purposes of example Local Area Networks (LANs). Subnet A 3 is shown coupled with a Router 7 which is in turn coupled with the Internet 5. Subnet A 3 is further coupled with the following systems: a Mail Relay 8, and a Telnet/FTP Relay 9. Subnet B 4 is coupled with the following systems: a Host A 10, Host B 12, Host C 11, Host D 13, and Router 14. Router 14 is coupled with Other Internal Networks 6.

A set of filtering rules describes how packets are allowed to flow across the Screening Router 2. The rules are provided to the Screening Router 2 for example by a network administrator whose responsibility is to protect any resources attached to Subnet B 4 from attack by entities in the Internet 5.

During operation of the elements shown in FIG. 1 an example embodiment of the presently disclosed packet filtering system runs on Screening Router 2. The packet filtering system provides packet filtering consistent with the filtering rules provided by the system administrator.

Figure 2:
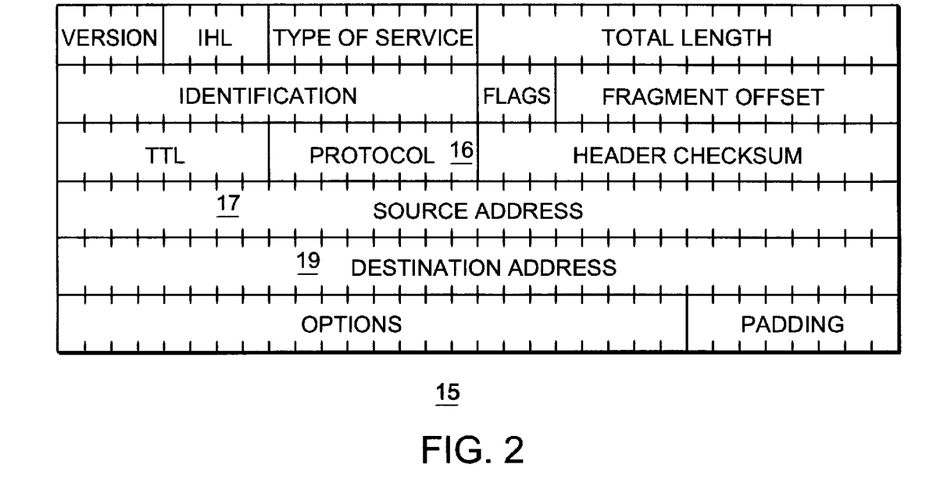
FIG. 2 shows fields within an IP header.

FIG. 2 shows fields within an IP header 15. The Protocol field 16 indicates a particular protocol to which the datagram belongs, for example, TCP or other. Source Address field 17 contains the IP address of the datagram's originating host. Destination Address field 19 contains the IP address of the datagram's target host.

The Source Address 30 and Destination Address 32 include a network number of 8 to 24 bits in length. Bits not used for network identification are used to refer to a host number and, optionally, a subnetwork number. The format of IP addresses in general is known to persons skilled in the art and briefly discussed below for purposes of explanation.

IP Addresses and Network Configurations

IP addressing allows for three different classes of possible network configurations. The three IP address classes, labeled for purposes of example A, B, and C, provide for internetworks (or "internets") which have:

A—many hosts on few networks;

B—a medium distribution of hosts and networks; and

C—few hosts on many networks.

An IP address consists of 32 bits. An internet connecting only a few subnetworks (also referred to as "subnets" or LANs) requires only a few bits for the network designation. The network designation is also referred to as an IP "network number". By convention, the network designation is contained in the high-order bits of the IP address. In an internet having many subnets more bits are required for network designation. Accordingly the IP address and mask formats for the three classifications are as follows (columns 2–4 show address format, and column 5 the mask format):

| Class | Initial Binary Bits | Number Net Bits | Number Host Bits | 32-Bit Hex Net Mask |
|---|---|---|---|---|
| A | 0XX | 7 | 24 | FF000000 |
| B | 10X | 14 | 16 | FFFF0000 |
| C | 110 | 21 | 8 | FFFFFF00 |

Upon presentation of a 32-bit IP address, it may be determined whether the address is a Class A, B, or C address by inspection of the initial bits of the address. If the first (high or most significant) bit is 0, then the address is Class A. If the first bit is 1, the second bit is examined. If the first bit is 1 and the second bit is 0 then the address is Class B. If the second bit is 1, then the third bit is examined. In that case the third bit is always 0 so the address is always Class C. A value of 1 for the third bit designates a Class D, which is not currently used. All possible combinations are as follows:

Class A: first bit 0

Class B: first bit 1; second bit 0

Class C: first bit 1; second bit 1; third bit 0

Class D: first bit 1; second bit 1; third bit 1

An IP address is typically displayed as four fields separated by "dots" (periods), each field being one byte (valued 0 through 255 decimal). The interpretation of these fields depends upon the class of the IP address.

The four-byte notation permits identification of the class of an address by examination of the first byte. Thus, the value of the first byte for Class A is 0 through 127, for Class B is 128 through 191, Class C is 192 through 223, Class D is 224 through 255. An example Class A address is 10.1.17.1, an example Class B address is 128.203.5.17, and an example Class C is 192.1.2.10.

Within a given network, hosts may be arranged into smaller communities, called subnetworks or "subnets". The IP address is additionally formatted to allow designation of subnets as well as hosts and networks. A subnet of an IP address is identified by masking off certain bits referred to as a "subnet identifier". The mask used to obtain the subnet identifier is referred to as a "subnet mask". The subnet mask also determines the location of the bits in an IP address used for host designation. Because the choice of how to allocate address bits between subnet identifier and host number is left to local administration in each host, a subnet mask from the host is needed to obtain a subnet identifier from an IP address.

The presently disclosed packet filtering system allows a network administrator to filter packets based on individual IP host addresses, on IP network numbers, or on IP network numbers plus subnet identifiers in received packets.

Figure 3:
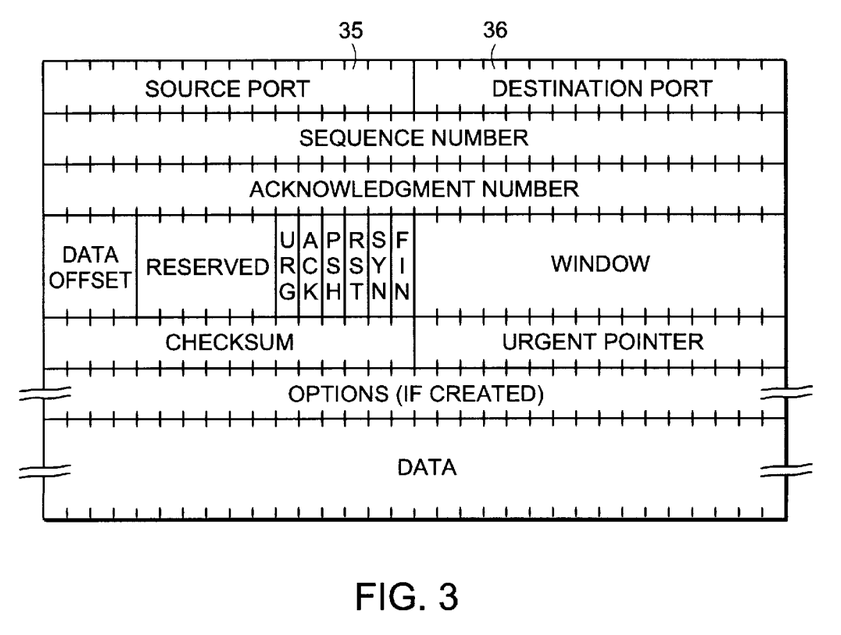
FIG. 3 shows fields within a TCP header.

FIG. 3 shows the format of a TCP header. The Source Port field 35 contains a port number which identifies a process or service in the sender's host. The combination of an IP address and a port number uniquely identifies what is referred to as a "socket" or point of access into a given process.

The Destination Port field 36 is a port number which identifies a process or service in the receiver's host. The Source and Destination Port fields 35 and 36 are under local control of their respective hosts. Each host decides how to allocate its own ports. Security policies implemented in the present packet filtering system may be indicated by rules specifying addressing information present in the headers of each packet, for example those headers shown in FIGS. 2 and 3.

Figure 4:
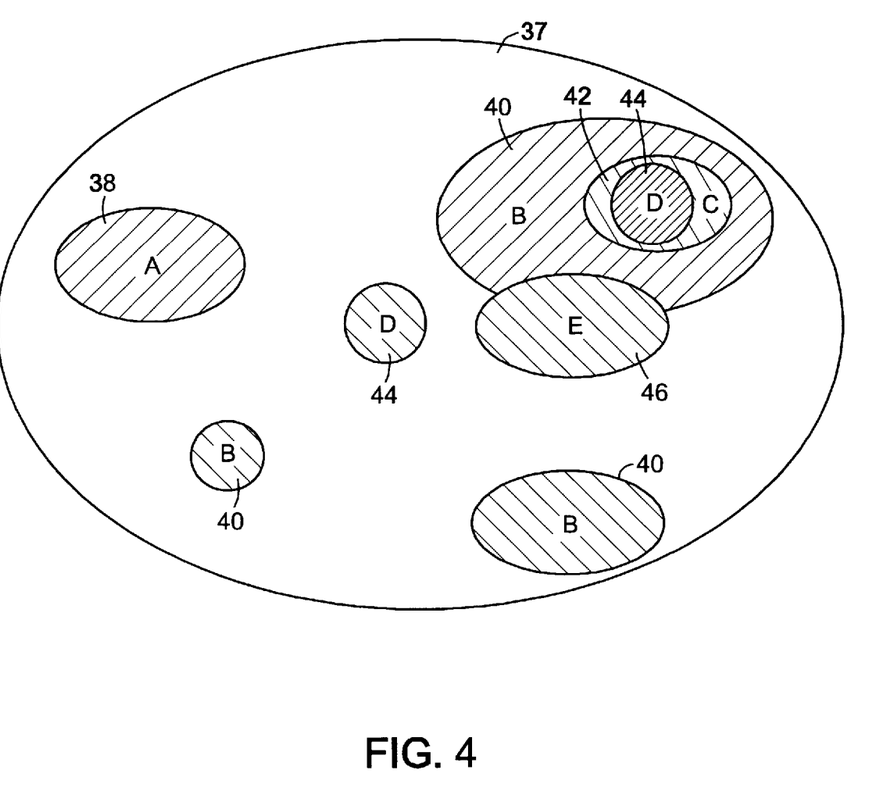
FIG. 4 shows filtering domains defined within a global address space.

FIG. 4 shows an example of filtering domains within an address space. While the example of FIG. 4 describes domains within an address space, filtering domains may also be defined within a protocol and/or port number range. In FIG. 4 an address space 37 is divided into a number of filtering domains. Each filtering domain designates at least one address from the address space 37, and each address within the address space 37 is mapped into exactly one filtering domain. The address or addresses within a filtering domain are determined by a set of one or more "domain prefixes" (also referred to as "domain masks") associated with that filtering domain. The set of domain prefixes for a domain are referred to as the "domain specification" for that domain. Each filtering domain is further associated with a unique filtering domain identifier. The filtering domain identifier for a filtering domain is used to generate an index into a filtering matrix.

In an example embodiment, a domain prefix consists of a bit string or mask, indicating a set of binary values, which when matched with corresponding bit values in an IP address, identifies that IP address as belonging to the filtering domain with which that domain prefix is associated.

In a first example embodiment, the locations of the bits in an IP address in a received packet that are compared with a domain prefix are predetermined to be contiguous in the high order bits of the address. In an alternative embodiment, the locations of these bits in an IP address are indicated at run time by an extension to the domain prefix, where the extension contains a bit value of '1' (one) in the position of each bit in an IP address to be compared with a corresponding bit in the domain mask.

Example domain specifications consist of a single prefix (as shown by Domain A 38) or multiple prefixes (as shown by Domain B 40). A filtering domain may be contained within another domain (as in Domain C 42 and Domain D 44). The present system uses a "Longest Prefix Matching" approach to ensure that any particular address matches only one domain prefix. Under Longest Prefix Matching, a given address is determined to match that domain whose domain specification includes a domain prefix having bit values that completely match the corresponding bits within the given address, and which contains the largest number of bits of any matching domain prefix.

Note that it is not possible to define a single domain prefix to specify Domain E 46. However, Domain E can be specified by a domain specification consisting of two domain prefixes. The first domain prefix is one defining the portion of Domain E which overlaps Domain B 40. The second domain prefix defines the portion of Domain E which does not overlap domain B 40.

Figure 5:
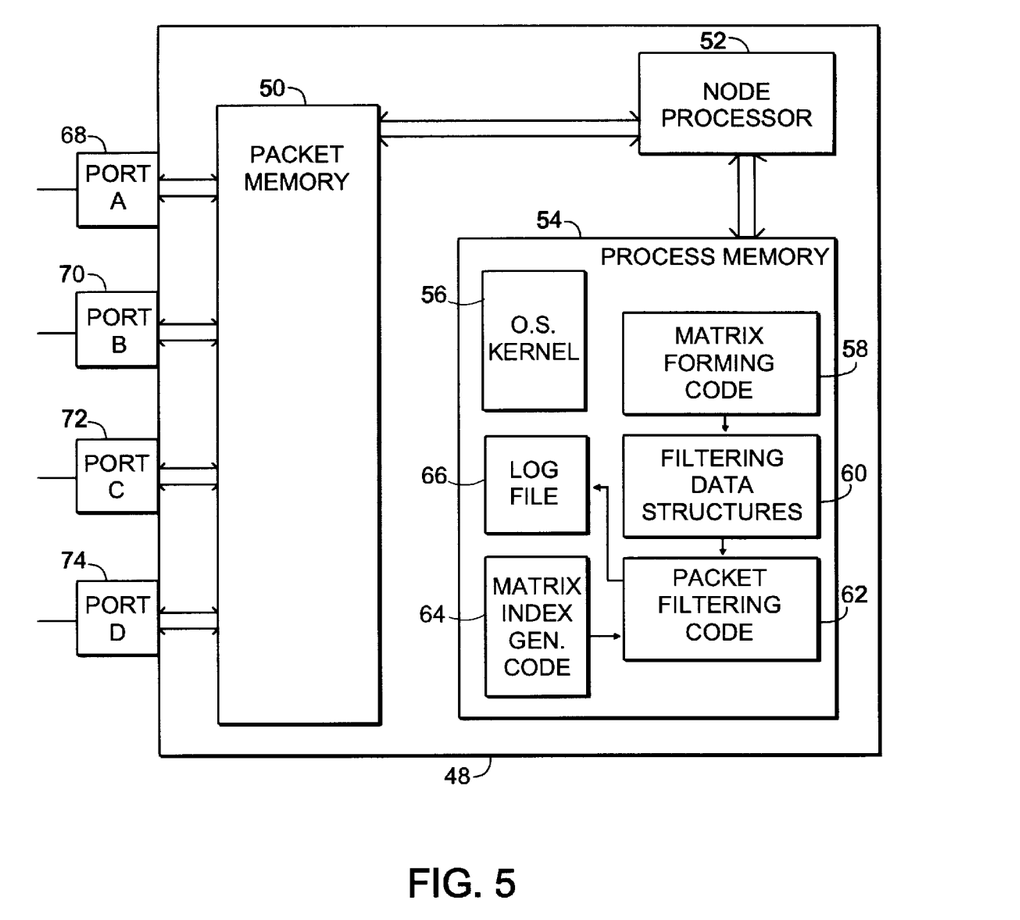
FIG. 5 shows elements in an example embodiment of a packet filtering device.

FIG. 5 shows an example embodiment of the present packet filtering system within a screening router. Screening Router 48 of FIG. 5 corresponds with Screening Router 2 of FIG. 1. Screening Router 48 of FIG. 5 is shown including a Packet Memory 50, a Node Processor 52 coupled with the Packet Memory 50, and a Process Memory 54 coupled with the Node Processor 52. The Screening Router 48 of FIG. 5 is further shown having a Port A 68, Port B 70, Port C 72, and Port D 74. Ports A through D are coupled with computer networks, for example Local Area Networks (also referred to as "subnets" of an internetwork created by the Screening Router 48). The Process Memory 54 is shown including an Operating System Kernel 56 as well as Matrix Forming Code 58. The Matrix Forming Code 58 generates Filtering Data Structures 60 which reflect filtering rules received from a network administrator either locally or across a network via one of Ports A through D. In an alternative embodiment, the Filtering Data Structures 60 themselves are received from a remote station via one of Ports A through D. The Filtering Data Structures 60 are in turn accessed by Packet Filtering Code 62 in order to determine whether received packets should be forwarded or dropped.

Packet Filtering Code 62 is triggered by Matrix Index Generating code 64 and the Operating System Kernel 56. The Operating System Kernel detects when a packet is received on one of Ports A through D, and as a result indicates to Matrix Index Generating Code 64 that a new Matrix Index should be generated responsive to information contained in the received packet, and indicates to Packet Filtering Code 62 that the packet should be filtered based on information contained in the Filtering Data Structures 60. A Log File 66 is further shown in Process Memory 54 for storing log entries created by the Packet Filtering Code 62 in response to received packets and information contained in the Filtering Data Structures 60.

Representation of Filtering Rules

Figure 6:
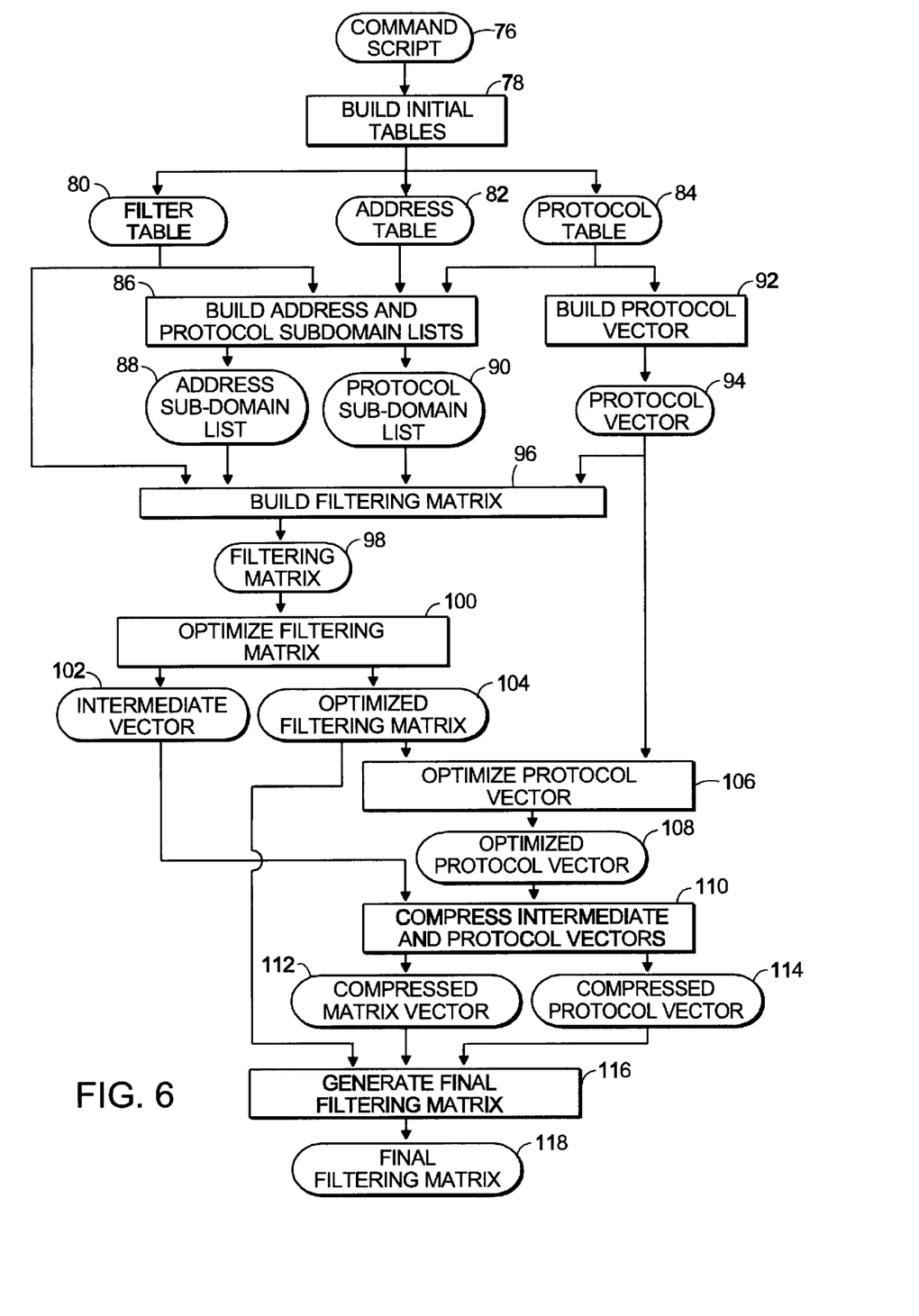
FIG. 6 shows an example embodiment of steps performed by matrix forming code.

The filtering information obtained or input from a system or network manager is represented in the form of a command script, for example Command Script 76 as shown in FIG. 6. A first example type of filtering rule in the Command Script 76 is an action specification. An action specification specifies a class of packets and an action to be taken when such a packet is received. In an example embodiment, an example filtering rule referred to as an "action specification" has the following syntax (indicated using Backus-Naur Form (BNF):

```
     from <object> to <object> {accept|reject} [notify]
[log];
or
     between <object> and <object> {accept|reject} [notify]
[log];
where:
<object> ::= { <address-spec> | <port-spec> | <address-spec>
                    <port-spec> }
<address-spec> ::= { <net-spec> | <subnet-spec>
                   | <host-spec>
                   | any }
<net-spec> ::= { net <name-or-addr>
                   | net-not <name-or-addr> }
<subnet-spec> ::= { subnet <name-or-addr>
                   | subnet-not <name-or-addr> }
<host-spec> ::= { host <name-or-addr>
                   | host-not <name-or-addr> }
<name-or-addr> ::= { <name> | <dotted-quad> | any }
<port-spec> ::= { proto <type-name-or-number>
                   | icmp <type-name-or-number>
                   | icmp type-not <type-name-or-number>
                   | tcp port <port-name-or-number>
                   | tcp port-not <port-name-or-number>
                   | udp port <port-name-or-number>
                   | udp port-not <port-name-or-number> }
<proto-name-or-number> ::= { <name> | <number> }
<type-name-or-number> ::= { <name> | <number> | any
                   | infotype }
<port-name-or-number> ::= { <name> | <number> | any
                   | reserved | xserver }
```

"Reserved" ports are for example those reserved by 4.2BSD UNIX for privileged processes. "Xserver" ports are for example those used by X1 window system servers. "Infotype" ICMP packets are for example those that are purely informational: echo, timestamp, information, and addressmask requests, and the corresponding replies.

In the example embodiment, if the <address-spec> is not given, any host will match. If the <port-spec> is not given, any protocol and port will match. The "-not" convention means that the object specification matches a received packet if the specified field does not have the specified value. The following example action specification indicates that packets not from "nic.ddn.mil" are dropped:
from host-not nic.ddn.mil to host any reject;

The "subnet" and "subnet-not" forms match against the entire address under the subnet mask. For example, if the netmask for net 36 is "255.255.0.0", then "subnet 36.8.0.0" matches a packet address of "36.8.0.1".

As shown above, "from" filtering rules indicate whether messages between a source address/source port combination and a destination address/destination port combination should be accepted or rejected. The "between" filtering rule indicates whether messages between a first address/first port combination and a second address/second port should be accepted or rejected. The "between" filtering rule is equivalent to two "from" filtering rules with the source and destination fields reversed. If "notify" is specified, when a packet is rejected based on that rule, an ICMP error message is returned to the packet source. If "log" is specified, each received packet that matches the rule is logged, as well as indication as to whether the packet was forwarded or dropped. Other example filtering rules are described below.

FIG. 6 shows the steps performed by an example embodiment of the Matrix Forming Code 58 as shown in FIG. 5. At step 78, the Matrix Forming Code 58 receives as an input a Command Script 76 containing one or more filtering rules. Further at step 78, the Matrix Forming Code 58 builds a number of Initial Tables, for example Filter Table 80, Address Table 82, and Protocol Table 84.

The Address Table

The Matrix Forming Code initially inserts each address from the filtering rules into an entry within the Address Table 82, as well as an address domain identifier associated with that address. The address domain identifier is the filtering domain ID associated with that address. In this way all unique addresses in the filtering rules are entered into the Address Table 82 and associated with domain identifiers.

The Address Table 82 generated in step 78 thus includes an entry for each unique IP address in the Command Script 76. Each entry includes a subnet mask value and an assigned domain identifier for the address. The result of applying the subnet mask value to the address results in a domain prefix or domain mask associated with the domain identifier in the entry. The entries having a given domain identifier define the set of domain prefixes associated with that domain identifier.

In an example embodiment, domain identifiers are allocated sequentially as new addresses are added to the table. In the example embodiment addresses are inserted into the Address Table 82 in ascending order, so that the lowest address appears at the start of the Address Table 82. Where two addresses are identical except for their subnet masks, the address having the shortest subnet mask is added first. An example of the Address Table is shown below:

| Address: 0.0.0.0 | Mask: 0.0.0.0 | Domain: 0 |
| Address: 16.1.0.0 | Mask: 0.0.0.0 | Domain: 3 |
| Address: 16.1.0.1 | Mask: 255.255.255.255 | Domain: 4 |
| Address: 16.1.16.0 | Mask: 255.255.240.0 | Domain: 2 |
| Address: 16.1.112.0 | Mask: 255.255.240.0 | Domain: 5 |
| Address: 16.1.240.0 | Mask: 255.255.240.0 | Domain: 8 |
| Address: 16.1.240.1 | Mask: 255.255.255.255 | Domain: 6 |
| Address: 16.1.240.2 | Mask: 255.255.255.255 | Domain: 1 |
| Address: 198.41.0.5 | Mask: 255.255.255.255 | Domain: 7 |

The Command Script 76 may include addresses specifying Networks, Subnets and Hosts. In an example embodiment the contents of the address Mask field in each entry of the Address Table 82 is determined as follows: A host address ordinarily has a default mask value of 255.255.255.255. A Subnet address takes its Mask field value from a "subnet mask" filtering rule. The syntax for a "subnet mask" filtering rule is as follows:
<subnet-spec> ::= for <network> netmask is <maskval> ;

An example of a subnet mask filtering rule is shown in the example below:
for 16.0.0.0 netmask is 255.255.240.0;

A network or subnet address entry which has no specified subnet mask is given the mask corresponding to the network class of the address. For example:

| Address Class | Mask |
|---|---|
| ClassA | 255.0.0.0 |
| ClassB | 255.255.0.0 |
| ClassC | 255.255.255.0 |

The set of domain identifiers used for source addresses need not be the same as that for destination addresses, i.e. the same address may map to a different domain identifier when used as a source address, than when it is used as a destination address. In such an example embodiment separate address tables are maintained for source and destination addresses. However, since the vast majority of filtering rules are "between" rules, rather than "from" rules, the filtering matrix will be nearly symmetrical between source and destination domains. A preferred embodiment, therefore, uses a single set of domain identifiers for both source and destination addresses, and also a single address table. Thus, the address matching performed for a source address uses the identical address table as is used for destination addresses.

In operating environments where the primary goal is to reduce the size of the Filtering Matrix to an absolute minimum, and especially where there is likely to be some degree of asymmetry introduced by the use of "from" rules, best optimization will be achieved by treating the source and destination address domains separately.

The Protocol Table

Also in step 78 the Matrix Forming Code inserts each unique protocol from the filtering rules into an entry within the Protocol Table 84. Each protocol is assigned a protocol domain identifier which is stored in the entry for that protocol in the Protocol Table 84. The protocol domain identifier is the protocol filtering domain ID for that protocol.

Each entry in the Protocol Table 84 includes a unique protocol identifier associated, for example by means of an external table, with the corresponding protocol for that entry. The protocol identifier is used to associate each protocol type in a received packet with one or more entries in the Protocol Table 84. Also included in each entry in the Protocol Table 84 is a range of one or more port numbers associated with the protocol for that entry. In some operating environments, more than one range of port numbers is used independently within a given protocol. In such operating environments a given protocol may have more than one entry in the Protocol Table, with each entry indicating a separate range of port numbers.

An example embodiment of the present system supports packet filtering based on a number of predetermined IP protocols, for example UDP and TCP. UDP and TCP packets include fields identifying both source and destination port number. In some operating environments, UDP and TCP protocols are preassigned specific ports, e.g. the TCP protocol is assigned port 27. Accordingly, for a filtering rule regarding a protocol preassigned to a specific port, the protocol range in the resulting entry in the Protocol Table 84 designates a range of 1, e.g. (27 . . . 27).

In another example operating environment, UDP and TCP protocol ports fall into two categories each, Reserved and Non-Reserved ports. These port ranges are represented in the Protocol Table 84 by entries for their respective port ranges, e.g. the entry for any port number within the "TCP Reserve" range covers all port numbers within that predetermined range of port numbers, for example (0 . . . 1023). In other operating environments, UDP and TCP include other predefined port ranges, such as the "Xserver" range. Command script filtering rules relating to a port within such a predefined range results in an entry specifying the entire predefined range within -he Protocol Table 84.

Protocols may also be specified by individual port numbers in the command script, which are associated with no specific predetermined type or range. Such protocols are referred to simply by the port number given in the command script filtering rule, for example by "proto 94" or "proto 72". These protocols have a port range equal to the one port number specified in the command. In the protocol table these protocols are entered as for example 94 or 72, respectively, and their ranges are also set to (94 . . . 94) or (72 . . . 72).

For each entry in the protocol table 84 there further is assigned a domain identifier. Domain identifiers are for example allocated sequentially, as new protocols are added to the table. Protocols may be inserted in order of value, so that the smallest protocol type appears at the start of the table.

Entries in the Protocol Table 84 are for example ordered within each protocol by size of range, the largest range appearing first. Below is an example embodiment of the Protocol Table 84, each entry being shown on a single line:

| Protocol: 000 | (ANY)   | Range: 0 to 65535   | Domain: 003 |
|---|---|---|---|
| Protocol: 001 | (ICMP)  | Range: 0 to 146     | Domain: 004 |
| Protocol: 001 | (ICMP)  | Range: 128 to 146   | Domain: 007 |
| Protocol: 006 | (TCP)   | Range: 0 to 65535   | Domain: 005 |
| Protocol: 006 | (TCP)   | Range: 0 to 1023    | Domain: 008 |
| Protocol: 006 | (TCP)   | Value: 20           | Domain: 001 |
| Protocol: 006 | (TCP)   | Value: 21           | Domain: 006 |
| Protocol: 017 | (UDP)   | Range: 0 to 65535   | Domain: 000 |
| Protocol: 017 | (UDP)   | Range: 0 to 1023    | Domain: 010 |
| Protocol: 017 | (UDP)   | Value: 53           | Domain: 009 |
| Protocol: 094 | (PROTO) | Value: 94           | Domain: 002 |

The Filter Table

The Filter Table 80 generally contains one entry for each rule in the Command Script 76. "Between" rules are for example processed as two "from" rules, and accordingly result in two entries in the Filter Table 80. Each filtering rule in the Command Script 76 may for example include a source IP address, a destination IP address, a source protocol (and port), a destination protocol (and port), and an action (forward or discard), as described above. Each entry in the Filter Table 80 includes the address domain identifiers and protocol domain identifier for each part of a corresponding filtering rule in the Command Script 76, as well as the action to be performed for received packets that meet all the conditions of the rule. In this way the Filter Table 80 binds together entries in the Address Table 82 and Protocol Table 84.

In an example embodiment of step 78, the Matrix Forming Code processes a filtering command specifying a default action. The default action is taken for any received packet whose processing is not determined by another entry in the Filter Table 80. An example syntax for a default action specification provided as a filtering rule in the command script is (shown in BNF):

<default-action> ::= default {accept | reject} [notify] [log] ;

If no default action specification filtering rule is provided in the command script, the default action is reject. The Filtering Matrix is initialized to the default action before any other filtering rules in the command script are processed.

Subdomain Lists

At step 86, once the Filter Table 80, Address Table 82, and Protocol Table 84 have been built, the Matrix Forming Code builds an Address Subdomain list 88, and a Protocol Subdomain list 90. These two subdomain lists are built in order to conveniently form the Filtering Matrix using an inverse generation method, as described below.

The Address Subdomain list 88 contains a list of subaddresses for each address contained in the Address Table 82. In this way the Address Subdomain list 88 associates an address with each of its subaddresses. At step 86 the Address Subdomain list 88 is built such that for two given addresses "A1" and "A2", having respective associated masks "M1" and "M2", A2 is a subaddress, or more specific address of A1 if (A1 & M1–A2 & M1) && (A1 M2 !=A2 & M2). The below examples show how an example embodiment determines whether A1 is a subaddress of A2 and vice versa (the symbol "=>" is read "therefore"):

```
1. Let A1 = 16.36.240.10
       A2 = 16.36.240.0
       M1 = 255.255.255.255
       M2 = 255.255.240.0
   A1 & M1 = 16.36.240.10
   A2 & M1 = 16.36.240.0
   => (A1 & M1 != A2 & M1)
   => 16.36.240.0 is not a sub-address of 16.36.240.10
2. Let A1 = 16.36.240.0
       A2 = 16.36.240.10
       M1 = 255.255.240.0
       M2 = 255.255.255.255
   A1 & M1 = 16.36.240.0
   A2 & M1 = 16.36.240.0
   => (A1 & M1 = A2 & M1)
   A1 & M2 = 16.36.240.0
   A2 & M2 = 16.36.240.10
   => (A1 & M2 != A2 & M2)
   => 16.36.240.10 is a sub-address of 16.36.240.0
```

The addresses must be tried both ways to eliminate the case where the addresses and masks are identical. If A2 is a subaddress of A1 then the address domain for A2 is a subdomain of the address domain for address A1. For each address, and therefore, address domain, a list of all the subdomains is formed in the Address Subdomain list 88. An example embodiment of Address Subdomain list 88 is shown below:

```
Address Table

Address: 0.0.0.0      Mask: 0.0.0.0           Domain: 1
Address: 16.0.0.1     Mask: 255.255.255.255   Domain: 0
Address: 16.0.0.2     Mask: 255.255.255.255   Domain: 3
Address: 16.0.0.3     Mask: 255.255.255.255   Domain: 2
Address: 16.0.0.4     Mask: 255.255.255.255   Domain: 4
Address Subdomain list 88

Domain 000 Address 16.0.0.1 Mask 255.255.255.255
Subdomains: 0
NOT Subdomains: 1,2,3,4
Domain 001 Address 0.0.0.0 Mask 0.0.0.0
Subdomains: 0,1,2,3,4
NOT Subdomains:
Domain 002 Address 16.0.0.3 Mask 255.255.255.255
Subdomains: 2
NOT Subdomains: 0,1,3,4
Domain 003 Address 16.0.0.2 Mask 255.255.255.255
Subdomains: 3
NOT Subdomains: 0,1,2,4
Domain 004 Address 16.0.0.4 Mask 255.255.255.255
Subdomains: 4
NOT Subdomains: 0,1,2,3
```

Further at step 86 the Protocol Subdomain list 90 is built consisting of a Protocol Subdomain list for each Protocol in the Protocol Table 84. For any two protocols in the Command Script 76, "P1" and "P2", having associated respective port ranges, "R1L" . . . R1H" and "R2L . . . R2H", P2 is determined to be a subprotocol of P1 at step 86 if:

```
(P1 == P2) && (R1L <= R2L) && (R1H >= R2H)
e.g. P1=TCP,  R1L=0,    R1H=1023
     P2=TCP,  R2L=24,   R2H=24
```

The protocol domain for P2 in the above example is therefore a subdomain of the protocol domain for protocol P1. For each protocol, and therefore, protocol domain, a list of all the subdomains is formed. The following shows an example embodiment of a Protocol Sub-Domain list:

```
Protocol Table 84

Protocol: 017 (UDP)      Range: 0 to 18      Domain: 002
Protocol: 006 (TCP)      Range: 0 to 65535   Domain: 000
Protocol: 016 (PROTO)    Value: 25           Domain: 001
Protocol Subdomain list 90

Domain 000 Protocol 006  (TCP)               Range:
(00000,65535)
Subdomains: 0,1
NOT Subdomains: 2
NOT  PORT Subdomains:
Domain 001 Protocol 006  (TCP)               Range:
(00025,00025)
Subdomains: 1
NOT Subdomains: 2
NOT PORT Subdomains: 0
Domain 002 Protocol 000  (ANY)               Range:
(00000,65535)
Subdomains: 0,1,2
NOT Subdomains:
NOT PORT Subdomains:
```

As mentioned above, the Command Script 76 may include "not" type filtering rules. These are rules with a negative effect. There are "not" address rules, "not" protocol rules, and "not" protocol port rules. Below are shown examples of "host-not", "subnet-not", "net-not", and "tcp port-not" commands:

from host 16.0.0.2 to host-not 16.0.0.4 accept
from host 16.0.0.2 to subnet-not 16.16.240.0 accept;
from host 16.0.0.2 to net-not 16.0.0.0 accept;
from host 16.0.0.1 tcp port-not reserved to host 16.0.0.3 accept;

At step 86 there is also created a different set of subdomains for "not" addresses and "not" protocols, the "not" subdomains equal to the reverse of the subdomain list. For "not" protocol ports, the "not" subdomain list contains all the domains that exist for that particular protocol, minus those that exist in the subdomain list. In an example embodiment, "not" rules are indicated by setting a flag for each field in the filter table entry within the Filter Table 80. All possible subdomain and NOT subdomain lists are built, and it is the Filter Table 80 which indicates which list should be referred to during inverse generation of the Filtering Matrix. The subdomain lists 88 and 90 include the domain identifier for each subdomain list. This is also used during the inverse generation procedure.

The Protocol Vector

Of the possible combinations of entries in the Protocol Table 84 associated with the protocol information in a received packet header, there are a number which are predetermined to be impossible. The Matrix Forming Code identifies these impossible protocol combinations in the filtering rules in order to create a smaller filtering matrix. To this end, at step 92, a Protocol Vector 94 is formed by the Matrix Forming Code. The Protocol Vector 94 is a two dimensional table of all potential protocol combinations that can be formed from entries in the Protocol Table 84. Each possible combination is sequentially assigned a "protocol index". If the combination is impossible a zero value is assigned. For example it is impossible for a received packet to have a source protocol value different from its destination protocol value. This follows because there is only one protocol field in each packet. The Protocol Vector 94 is formed to reflect this fact by the Matrix Forming Code at step 92.

The Filtering Matrix

At step 96, taking as input the Filter Table 80, the Protocol Vector 94 and the subdomain lists 88 and 90, the Matrix Forming Code builds the Filtering Matrix 98. The Filtering Matrix in its most basic form is four dimensional, having a dimension for each of the source protocol domain, destination protocol domain, source domain and destination domain. But in an example embodiment, the source and destination protocol domains are combined in to a single dimension, and the resulting filtering matrix is an array of entries having three dimensions equal to:

(possible source/destination protocol domain combinations)
  *(address domains (source))*(address domains (destination))

The Filtering Matrix is built using either exhaustive or inverse generation, as described below. Each entry within the Filtering Matrix contains an indication of whether a received packet whose header information maps to that entry should be forwarded or dropped. Accordingly, when a packet is received, the header of packet is examined, and the filtering domains associated with the header information are determined. The resultant domain identifiers are then used to index into the Filtering Matrix to determine whether the packet should be forwarded or dropped.

Optimization of the Filtering Matrix

At step 100 the Matrix Forming Code optimizes the Filtering Matrix 98. The first level of optimization performed at step 100 includes searching the Filtering Matrix 98 and identifying duplicate bit planes along each of the axis.

It will frequently be the case that a number of filtering domains will be equivalent. For example there may be a set of hosts which all require the same access to other hosts using the same protocols. This is represented in the Command Script by identical filtering rules for each host address in the set. Similarly, the set of hosts which may use one protocol may be identical to those which may use some other protocol, which will result in sets of rules which are identical except for the protocol type.

The present system detects equivalent domains by for example scanning the initial Filtering Matrix 98 for identical bit planes (also referred to as "slices"). Two domain identifiers are equivalent if the slices in the Filtering Matrix associated with the identifiers are identical. For example, where two protocol domains are determined to be equivalent, the associated domain identifiers in the Protocol Table (or protocol indices in the Protocol Vector) are replaced with a single common value. The Filtering Matrix is then adjusted to reflect this by immediately "shuffling up" the non-redundant slices to remove the redundant slice.

In an alternative example embodiment, in which the Filtering Matrix is not immediately shuffled to remove a redundant slice, a relatively small data structure, the Intermediate Vector 102, is formed to handle the case where multiple address domains are determined to be equivalent. The Intermediate Vector 102 directs references to duplicate filtering domains to a single Filtering Matrix bit plane. The Intermediate Vector 102 is for example a mapping of address domain identifiers from the Address Table to values (referred to as "mapped domain identifiers"), and used when forming an index to the Filtering Matrix. For example where there is both a Source Address Table and a Destination Address Table, there are corresponding Intermediate Vectors for each. In another example embodiment, the mapped domain identifiers are written directly into the Address Table, reflecting the determination of any redundant address bit planes in the Filtering Matrix, and thus eliminating any need for a separate Intermediate Vector. Subsequently, the mapped domain identifiers in the Intermediate Vector may be used to regenerate the Filtering Matrix in order to remove redundant slices.

The bit plane comparison and optimization at step 100 is speeded up by summing of bit vector planes. Individual bits of the planes are not directly compared unless the sums of the two planes are the same. Once a plane has been optimized away, it is not interrogated in future optimizations.

For example, at step 100, in order to optimize source address domains, the Filtering Matrix 98 is searched from Filtering Matrix[s1][d][p] to Filtering Matrix[sN][d][p], where s is the whole source domain axis, d is the whole destination domain axis, and p is the combined source/destination protocol axis. For each plane in the Filtering Matrix 98, for example stepping through each plane indicated by each of source address domain identifier sl through source address domain identifier sN, the bit sum is recorded. In this example embodiment, each entry in the Filtering Matrix is a single bit value indicating whether a received packet having information mapping to that entry should be accepted or filtered. After the bit plane bit sums are determined, only those planes that have an equal bit sum are compared, bit by bit. Thus a significant number of bit by bit comparisons are avoided for bit planes not having identical bit sums.

An example embodiment of Intermediate Vector 102 is now described. The bit planes for source domains s1 through s4 have been compared, and it has been determined that the plane for source domain s1 has the same bit sum, and is exactly identical to plane for source domain s3 for all values of d and p. An example of entries in a Source Domain Intermediate vector (since there are separate Source and Destination Address Tables in this example, there are also separate corresponding Intermediate Vector 102) of the resultant Intermediate Vector 102 for source domain identifiers s1 through s4 are:

Entry for Domain identifier 1: s1
  Entry for Domain identifier 2: s2
  Entry for Domain identifier 3: s1
  Entry for Domain identifier 4: s4 where s1 is the index into the Filtering Matrix for source domain identifier 1, s2 is the index into the Filtering Matrix for source domain identifier 2, etc.

The Intermediate Vector 102 is then used to obtain the source domain value used to generate the index for accessing the Filtering Matrix 98, leaving protocol plane 3 redundant. Accordingly at step 100 the Filtering Matrix 98 is optimized by removing plane 3. Similarly at step 100 the Matrix Forming code examines the Filtering Matrix 98 and identifies and eliminates all other redundant bit planes. The result is Optimized Filtering Matrix 104. During operation, the Intermediate Vector 102 is used to direct duplicate indexes to the remaining planes within the Optimized Filtering Matrix 104.

The Optimized Protocol Vector

The Protocol Vector 94 is further optimized at step 106 by detection of "reflection" protocol bit slices in the Filtering Matrix Forming code. The Filtering Matrix Forming code detects a condition in the Optimized Filtering Matrix 104 that occurs when the entry in the Optimized Filtering Matrix[s][d][p1] is the same as Optimized Filtering Matrix[d][s][p2], for all values of source and destination address domains s and d. This condition indicates that the two protocol planes are reflections of each other, and therefore redundant.

Accordingly in an example embodiment, the present system at step 106 determines whether for all values of i and j Filtering Matrix[i][j][x]=Filtering Matrix[j][i][y].

Where the above condition is found to be true, the value of p2 in the Protocol Vector is replaced by the Matrix Forming Code with the value −p1. In the example embodiment a Filtering Matrix look-up function is configured to swap [s] and [d] indexes when a negative Protocol Vector value is accessed. The Protocol Vector value used to generate the index into the Filtering Matrix is always the absolute value. The output of step 106 is an optimized protocol vector 108.

At step 110 the Matrix Forming code compresses the Intermediate Vector 102 and the Protocol Vector 94 to create the Compressed Intermediate Vector 112 and the Compressed Protocol Vector 114. The Intermediate Vector 102, and the Optimized Protocol Vector 108 are compressed at step 110, in that entries for redundant indexes are removed by the Matrix Forming Code. Step 110 includes reassigning the domain values in the Intermediate Vector and the Optimized Protocol Vector.

Once the compression at step 110 is complete, a Final Filtering Matrix is generated at step 116 having no redundant planes or slices. The output of step 116 is the Final Filtering Matrix 118.

As shown in FIG. 6, in general there is a considerable degree of redundancy in the information contained in the Filtering Matrix. The present invention removes this redundancy, and as a result the Final Filtering Matrix is made considerably smaller than the unoptimized version. This is advantageous where there is more memory available for use during generation of the Filtering Matrix than when it is in use. For example, memory used for the initial computation might be freed up for use as packet buffers when the Filtering Matrix is in use. The Filtering Matrix may be generated by the present system completely off line to a router and then loaded into the router for use in an optimized form.

Filter Operation

Figure 7:
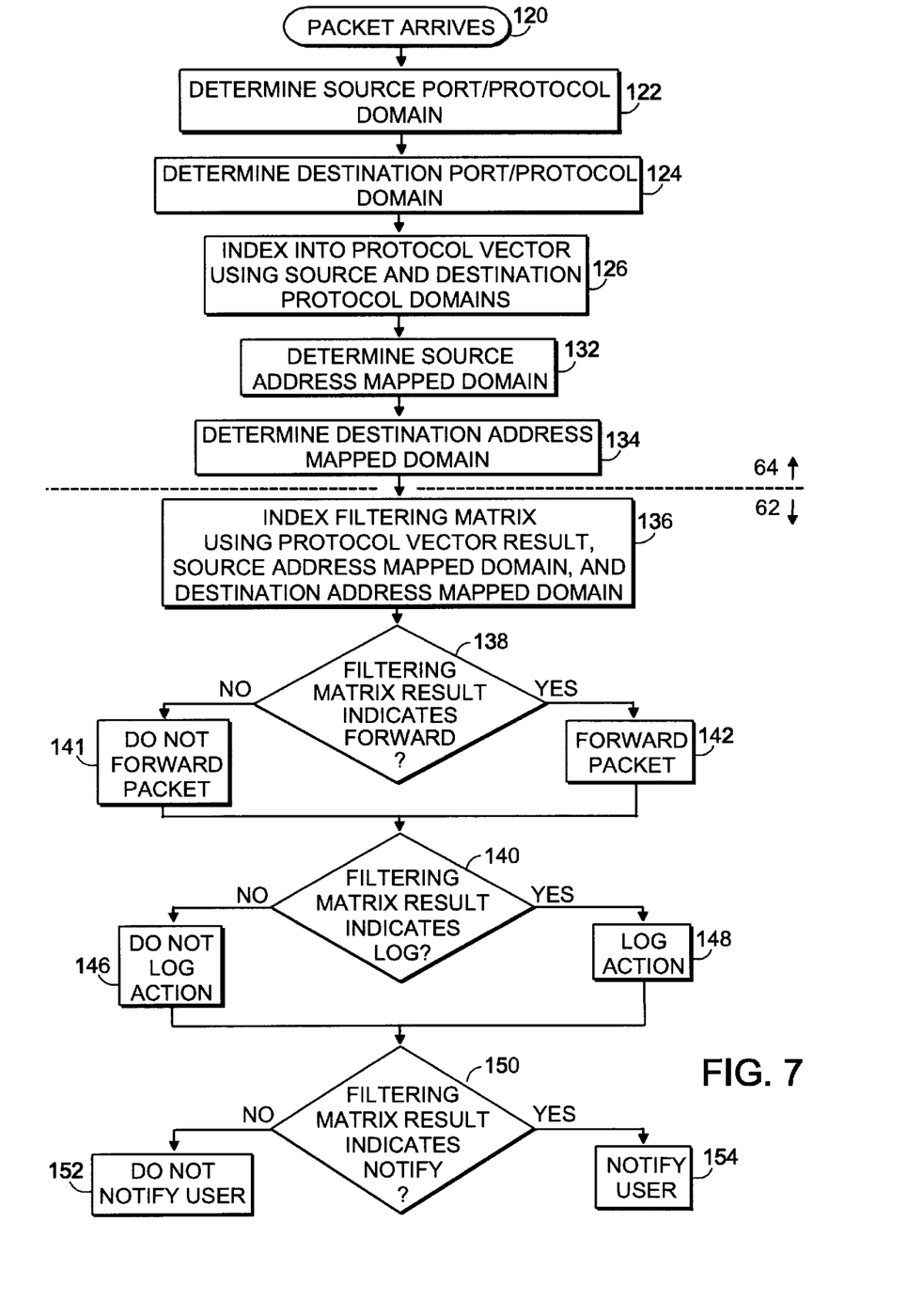
FIG. 7 shows steps performed in an example embodiment of matrix index generating code executing in response to arrival of a packet at the screening device.

Now with regard to FIG. 7 there is described a set of steps performed by an example embodiment of the present system in response to a received packet. The steps 120 through 134 of FIG. 7 are for example performed by the Matrix Index Generating Code 64 as shown in FIG. 5. The Matrix Index Generating Code is triggered by the arrival of a packet at step 120. Packet arrival is for example initially detected by the operating system of the forwarding device, such as Operating System Kernel 54 as shown in FIG. 5. The operating system then notifies the Matrix Index Generating Code that a packet has been received.

At step 122, the Matrix Index Generating Code determines the source protocol domain for the received by referencing the two dimensional Protocol Table based on the source protocol information in the received packet, and using a best match algorithm. This search returns the source protocol domain identifier.

At step 124, the Matrix Index Generating Code determines the destination protocol domain for the received packet. The Matrix Index Generating Code references the Protocol Table entry associated with the destination protocol information in the received packet using a best match algorithm. This search returns the destination protocol domain identifier.

At step 126 the Matrix Index Generating Code references the Protocol Vector entry (for example Protocol Vector 94 as shown in FIG. 6) indexed by the source and destination protocol domain identifiers determined in steps 122 and 124. Step 126 is followed by step 132.

At step 132 the Matrix Index Generating Code determines the source domain for the received packet. At step 132 the Matrix Index Generating Code looks up the entry corresponding with the source address of the received packet in the Address Table (for example Address Table 82 as shown in FIG. 6), and obtains the source domain identifier for the received packet.

At step 134, the Matrix Index Generating Code looks up the destination address in the address table and determines the destination domain identifier. The specific filtering domain identifier mapped to a given address is that one associated with a set of domain prefixes including the longest matching domain prefix for that given address. The longest matching domain prefix is the one having the greatest number of bit values matching the corresponding bits in the given address.

The steps 136 and following in FIG. 7 reflect steps performed by the present system in response to a received packet and generation of a Filtering Matrix index. For example, the steps 136 and following are performed by the Packet Filtering Code 62 as shown in FIG. 5. At step 136 the Packet Filtering Code indexes the Filtering Matrix using a Filtering Matrix index consisting of the combined protocol index, source domain identifier, and destination domain identifier. The filtering matrix is in this case three dimensional, and therefore indexed as follows:

filtering-matrix-entry=filtering_matrix[protocol_index] [source_domain_identifier][d estination_domain_ identifier]

Accordingly as shown in FIG. 7, at step 138 the Packet Filtering Code determines whether the filtering matrix entry indicates that the received packet should be forwarded. If the Filtering Matrix entry indicates that the packet should be forwarded, step 138 is followed by step 142. Otherwise, step 138 is followed by step 140.

After both step 140 and 142, the present system determines whether the filtering matrix entry returned by the index into the Filtering Matrix indicates that an action should be logged. If the filtering matrix entry indicates that the action should be logged, then step 144 is followed by step 148, in which the present system logs the action in the log file. Otherwise step 144 is followed by 146 in which the action is not logged.

At step 150 the present system determines whether the filtering matrix entry indicates that a user should be notified, for example, through ICMP, regarding the action taken as to the received packet. If the entry indexed in the Filtering Matrix indicates that a user should be notified, step 150 is followed by step 154, in which a user is notified of the filtering action taken. Otherwise, step 150 is followed by step 152 in which the user is not notified.

In an alternative example embodiment in which there is no protocol vector, the source domain identifier, destination domain identifier, source protocol domain identifier and destination protocol domain identifier are simply added together and multiplied by the filtering matrix entry size to produce the filtering matrix index. In a second alternative example embodiment, the actual index into the Filtering Matrix is obtained from the intermediate vector and the protocol vector.

Each entry in the filtering matrix includes a "filtering flag". If the filtering flag is equal to a first value then the received packet is to be forwarded. If the filtering flag is equal to a second value then the received packet is to be dropped or filtered.

In another example embodiment of the invention, determination of the destination domain identifier for an IP destination address in a received packet is performed simultaneously with determination of a forwarding/adjacency code for the received packet. A forwarding/adjacency code for a received packet indicates which outbound port of the receiving station should be used to forward the received packet in order for the packet to reach its ultimate destination. The forwarding/adjacency code is determined in part by a forwarding domain determined based on the destination address of the received packet.

Each possible forwarding domain is associated with a set of one or more forwarding prefixes. A forwarding prefix is a bit string and/or mask, indicating a set of binary values, which when matched with corresponding bits in a destination address, identifies that address as belonging to a specific forwarding domain. In an example embodiment, the corresponding bits in the address are predetermined to be located in the initial or high order bits of the address. In an alternative embodiment, the locations of the corresponding bits in the address are indicated by an extension to the forwarding prefix, consisting of a string of bits, where the string of bits contains bit values of one (1) in the locations of the corresponding bits in the address.

The forwarding domain for the destination address is determined by a longest prefix matching system. The forwarding domain is further associated with a forwarding/adjacency code for the received packet, which indicates an outbound port of the receiving station that should be used to forward the received packet. There are three possible relationships between the destination filtering domain prefix and the forwarding domain prefix that match a destination address in a received packet:

1. The filtering domain prefix is shorter than the forwarding domain prefix,
2. The filtering domain prefix is longer than the forwarding domain prefix, or
3. The filtering domain prefix is identical to the forwarding domain prefix.

In cases 1 and 2, the shorter prefix, is, of necessity, a substring of the longer. Accordingly in an example embodiment, the forwarding/adjacency code database or data structure is pre-formed including a destination domain identifier associated with each forwarding domain. Thus in cases 1 and 2, a single look-up into the Address Table based on the destination address will correctly return both the forwarding/adjacency code and the destination domain identifier. A second look-up is required to obtain the source domain identifier unless no filtering is done based on source domain.

Logging

Events are logged for example by the Packet Filtering Code 62 as shown in FIG. 5. When an event such as the filtering or dropping of a received packet, or in the alternative the forwarding of a received packet occurs, the occurrence of the event is recorded by the Packet Filtering Code in a log file, for example Log File 66 as shown in FIG. 5.

In a first example embodiment of the invention, event logging is achieved by including in each entry in the filtering matrix a code indicating both whether the packet should be rejected or accepted and whether the action taken should be logged or not logged. For example the code may be a two-bit number having the following values and associated meanings:

00-reject/no logging
01-reject and log
10-accept/no logging
11-accept and log

In a second example embodiment, filtering matrix storage space is limited for "fast path" packet processing. The fast path is generally hardware and/or high speed software used for ordinary packet reception. In the second example embodiment, a first portion of the filtering matrix is stored within and used by the fast path processing logic. A first portion of each entry is stored within the first portion of the filtering matrix. The first portion of the entry includes a single bit flag, having either a first value (for example, 1) indicating to 'accept' the received packet without logging, or a second value (for example 0) indicating that another action is required. Where the single bit flag is found by the Packet Filtering Code to be equal to the second value, the packet is passed to a background process within the Packet Filtering Code.

The background process uses the information in the received packet header to perform a lookup in a second portion of the filtering matrix. The second portion of the filtering matrix contains a second portion of each forwarding vector. The second portion of the forwarding vector includes a two bit value indicating whether the action associated with the received packet is to accept and log, reject, or reject and log the received packet.

This embodiment may also be configured such that the first portion of the forwarding vector includes only a single bit code indicating whether the received packet is to be accepted or rejected. If the packet is to be rejected, then it is passed to the background process for further processing based on the second portion of the filtering matrix. In this configuration, all rejected packets are forced through the "slow path" background processing, but in general the number of rejected packets will be small since they will never correspond to any established TCP connection.

In a further alternative embodiment, a management control command is provided to the network administrator while filtering is running to be used to enable or disable logging of all rejected packets. This further alternative embodiment allows a network administrator to turn logging on for a short time in order to capture a particular event. Logging would ordinarily would be turned off by default at initialization.

Rule Number Logging

As described above, an event log is maintained by an example embodiment of the present invention. During the logging of an event relating to a received packet by the Packet Filtering Code, another example embodiment has the capability to log a rule number associated with that event. The specific rule number logged for example corresponds with a filtering rule in the command script input by the network administrator, for example, which caused (at least in part) the forwarding vector for the received packet to be generated. In an example embodiment the present system maintains the rule numbers which are represented by a given Filtering Matrix entry. When an event is logged as required by that entry, the rule numbers stored within that entry are written to the event log.

Notification

A packet recipient, such as a receiving end station or intermediate routing device, may use one or more ICMP datagrams to inform a sending IP module that some aspect of the sender's behavior should be modified. ICMP datagrams are typically generated by a station which detects an error or problem in a packet sent by another station. The error may be detected either by the destination host or by an intermediate router. If the packet is undeliverable, ICMP may be used to alert the packet source that the destination network, machine, or port is unreachable. ICMP can also inform the sender of preferred routes or of network congestion. A simple datagram echoing system is further available based on ICMP. ICMP datagrams are sent using IP.

In another example embodiment, the command script of filtering rules further indicates whether or not to generate an ICMP error message when rejecting a packet within a given filtering domain. A similar implementation may be used as described for event logging, such that a "notification enabled" bit is included in the forwarding vector for each filtering domain. In a further example embodiment, where a portion of the filtering matrix is stored in a higher speed "fast path", the processing for whether notification should be made to the sender of a rejected packet is done by a background process within the Packet Filtering Code based on information stored in the second portion of the filtering matrix, which for example is used only for rejected packets.

Extensions Permitting Larger Filtering Requirements

The Filtering Matrix scheme in the above example embodiments permits high performance filtering. However, in implementation platforms where there is a limit on available memory, the complexities of the filtering information must accordingly be limited. In particular, the number of filter domains and protocol specifications are limited by the memory available for the Filtering Matrix. The present invention allows the majority of users to accommodate their filtering requirements within these constraints. However, in order to be flexible, filtering must be extensible to cover an essentially unlimited complexity of filtering rules. Thus, in an example embodiment of the present system a mechanism is provided whereby high performance filtering will be maintained until the maximum memory limits are exceeded. This example embodiment permits a user to define more than N-filter address domains and M-protocol specifications. However, any filtering rule referencing filter domains greater than N or protocol specifications greater than M is ignored when generating the filtering matrix.

When processing a received packet for which the filter domain ID is greater than N, or the protocol specification is greater than M, the filtering matrix is ignored by the Packet Filtering Code, and the relevant filter specification is identified by some other means, for example, by sequentially scanning the command script searching for a match, or by using a larger filtering matrix in less limited and presumably slower memory. The received packet shall be disposed of as indicated by the matching filter rule or Filtering Matrix entry. The processing speed of received packets in this example embodiment is dependent on which filtering rule they match.

Generation of the Filtering Matrix

There are two alternative embodiments of the present system with regard to how the filtering matrix is constructed, for example by the Matrix Forming Code 58 as shown in FIG. 5.

Exhaustive Generation

Each entry in the Filtering Matrix corresponds to one or more a potential received packets, with addresses and protocols as defined by the corresponding domains. Where a domain includes a prefix matching a complete address or protocol (for example, a subnet such as 16.1.36, or a protocol such as "all reserved TCP ports"), then the address or protocol in the corresponding received packet is one which matches that domain only, and not any more specific domains. In an example embodiment using Exhaustive Generation of the Filtering Matrix, a packet is generated internally corresponding with the address and protocol values for each entry in the Filtering Matrix. The filtering rules in the command script are scanned in order to find the first rule that matches. The entry in the Filtering Matrix corresponding with the packet is then set according to the disposition set forth in the first matching filtering rule, for example accept or reject. While simple to implement, the example embodiment using exhaustive generation requires on the order $(NM)^2R$ operations, where R is the number of filtering rules in the command script. This can require excessive processing resources in order to recompute a large Filtering Matrix in a reasonable time.

Inverse Generation

Figure 8:
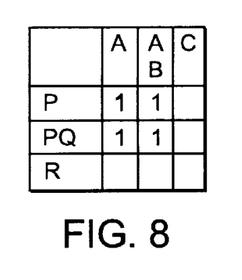
FIG. 8 shows an example embodiment of a filtering matrix during inverse generation.
Figure 9:
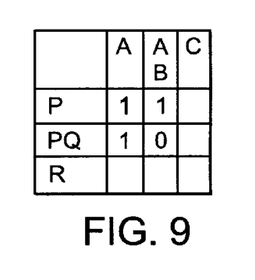
FIG. 9 shows an example embodiment of a filtering matrix during inverse generation.

FIGS. 8 and 9 show an example embodiment of Filtering Matrix generation using inverse generation. In the inverse generation example embodiment, less processing is required than in the exhaustive generation example embodiment. In the inverse generation example embodiment, the filtering rules in the command script are scanned in reverse order. As each filtering rule is scanned, all filtering flags in Filtering Matrix entries corresponding to packets which could be matched by that rule are set according to the disposition indicated by the rule. It is possible that a packet can match multiple filtering rules and normally only the first rule encountered determines the disposition for that packet.

In order to determine the filtering flag values of all entries affected by each filtering rule, the Matrix Forming Code includes not only the Filtering Matrix entry identified by the four domain identifiers explicitly written in the rules, but also all combinations of more specific domains which would also match the domains in the rule. These are the subdomains found in the subdomain lists. For example, in FIG. 8, shown in two dimensions for simplicity, and where each entry in the Filtering Matrix consists of only a filtering flag, if there exist domains A, AB, C, P, PQ, and R where AB is a more specific domain than A, and PQ more specific than P, the filtering rule:

from A to B accept;

causes the system to set the bits shown in FIG. 8, specifically where 0=reject and 1=accept. This is true since all the packets containing address or protocol information matching the domains {A, P}, {A, PQ}, {AB, P} and {AB, PQ} will have their disposition determined by this rule.

Accordingly, the following two rules (in the following order):

from AB to PQ reject
from A to B accept causes the inverse generation embodiment of the Matrix Forming Code to set the bits in the Filtering Matrix as shown in FIG. 9.

The resultant Filtering Matrix formed by inverse generation is identical to that produced by the exhaustive method described previously. Although the algorithm is more complex, it generally requires much less processing resources, since the majority of domains referenced in a typical script are leaf domains (i.e. there are no more specific domains).

Combining Other Dimensions

Figure 10:
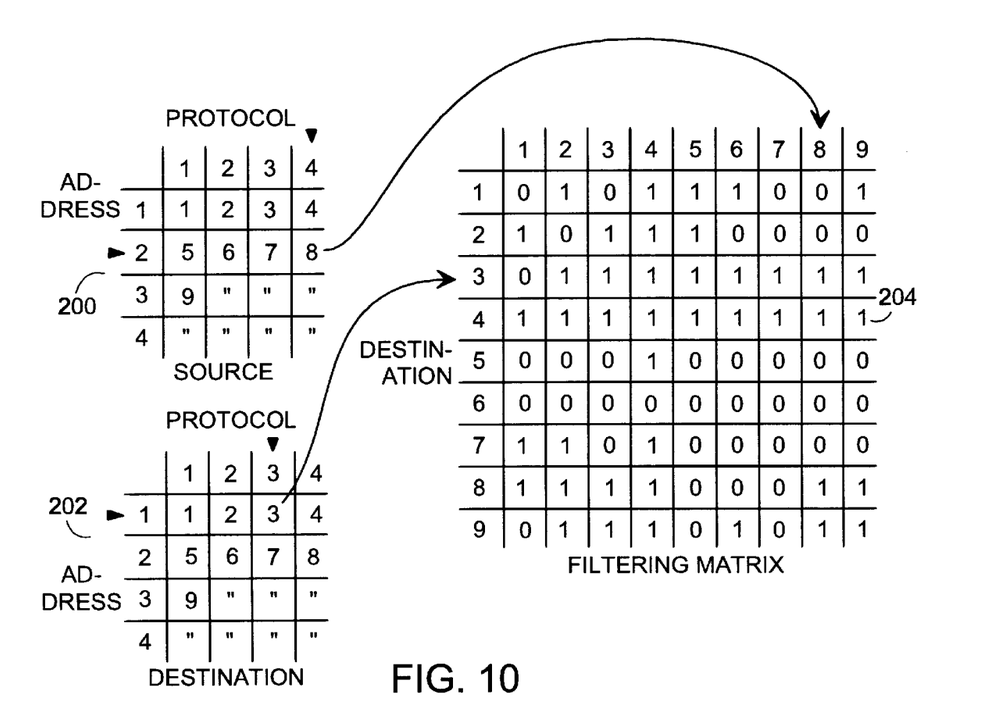
FIG. 10 shows an alternative example embodiment of intermediate vectors used to combine dimensions.

FIG. 10 shows an alternative embodiment in which two dimensions are combined using intermediate vectors to combine source address and source protocol, and destination address and destination protocol. Without any combination of dimensions, the Filtering Matrix is four dimensional, indexed by source address, source protocol, destination address and destination protocol. In the example embodiment, two dimensions are combined, and as a result the number of dimensions in the Filtering Matrix is reduced. In this example embodiment, it is possible to perform a simultaneous look up of both address and protocol type (i.e. source address and source protocol, or destination address and destination protocol).

Each unique combined address/protocol domain is assigned an index by the Matrix Forming Code. The address/ protocol domain index is used by the Packet Filtering Code to obtain an entry from a two-dimensional Filtering Matrix in response to a received packet. This is illustrated in FIG. 10.

In FIG. 10 the combination of address and protocol is represented in a Source Intermediate Vector 200 and a Destination Intermediate Vector 202. The Source Intermediate Vector 200 and Destination Intermediate Vector 202 are produced at step 100 as shown in FIG. 6. The indices to the Source Intermediate Vector are a Source Domain identifier (for the source address) and a Source Protocol Domain identifier. The contents of each entry in the Source Intermediate Vector 200 is a Source index into the Filtering Matrix 204. The indices to the Destination Intermediate Vector 202 are a Destination Domain identifier (for the destination address) and a Destination Protocol Domain identifier. The contents of each entry in the Destination Intermediate Vector 202 is a Destination index into the Filtering Matrix 204.

During operation of the elements shown in FIG. 10, the Matrix Index Generating Code 64 uses the Address Table and the Protocol Table to determine the Source Domain identifier, Destination Domain identifier, source protocol domain identifier and destination protocol domain identifier of a received packet. The Matrix Index Generating Code 64 then obtains the corresponding entries from the Source Intermediate and Destination Intermediate Vectors, and passes the contents of these entries to the Packet Filtering Code. The packet filtering code then uses the Intermediate Vector entry contents to access the Filtering Matrix 204. For example, where the Source Intermediate Vector entry contents is 8, and the Destination Intermediate Vector entry contents is 3, then the result of accessing the Filtering Matrix 204 would be a Filtering Matrix entry having a value of 1. In an example embodiment, a Filtering Matrix entry value of 1 indicates that the received packet should be forwarded and a Filtering Matrix entry value of 0 indicates that the received packet should be filtered or dropped.

While the invention has been described with reference to specific example embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments which tall within the true scope of the invention.

What is claimed is:

1. A system for filtering a received packet, comprising:
   means for associating one or more network station addresses with one or more respective domain identifiers;
   first means for retrieving a source domain identifier from said associating means as a function of a source network station address of the received packet;
   second means for retrieving a destination domain identifier from said associating means as a function of a destination network station address of the received packet;
   a filtering matrix including one or more entries, each one of said entries including a forwarding flag;
   means for retrieving one of the entries in the filtering matrix as a function of the source domain identifier and the destination domain identifier; and
   means for forwarding said received packet if said forwarding flag in said retrieved one of said filtering matrix entries is equal to a first value.

2. The system as in claim 1, further comprising:
   means for dropping said received packet if said forwarding flag in said one of said retrieved filtering matrix entries is equal to a second value.

3. The system as in claim 1, wherein said means for associating one or more network station addresses with a domain identifier includes an address table, said address table having one or more entries, each said address table entry including a domain prefix and a domain identifier.

4. The system as in claim 3, wherein said first and second means for retrieving a domain identifier performs a search on said address table for an address table entry having a domain prefix matching said source and destination network station addresses in said received packet respectively.

5. The system as in claim 4, further comprising:
   means for determining a port on which to forward said received packet responsive to said address table entry having a domain prefix matching said address in said received packet.

6. A system for filtering a received packet, comprising:
   means for associating a first set of one or more network layer addresses with a first domain identifier;
   means for associating a second set of one or more network layer network addresses with a second domain identifier;
   means for associating a network protocol combined with a range of source port numbers and a range of destination port numbers with a protocol index;
   a filtering matrix including one or more entries, each one of said entries including a forwarding flag;
   means for determining that a network layer source address in said received packet is in said first set of one or more network layer addresses;
   means for determining that a network layer destination address in said received packet is in said second set of one or more network layer addresses;
   protocol domain determining means for determining that a protocol type of said received packet is equal to said network protocol, and that a source port number of said received packet is within said range of source port numbers, and that a destination port number of said received packet is within said range of destination port numbers; and
   means for generating an index into said filtering matrix responsive to said first domain identifier, said second domain identifier, and said protocol index.

7. The system as in claim 6, wherein said means for generating combines the values of said first domain identifier, said second domain identifier, and said protocol domain identifier to generate said index into said filtering matrix.

8. The system as in claim 7, wherein said means for associating a first set of one or more network layer addresses with a first domain identifier includes a source address table, said source address table having one or more entries, each one of said source address table entries having a domain prefix and a domain identifier associated with that domain prefix.

9. The system as in claim 7 wherein said means for associating a second set of one or more network layer network addresses with a second domain identifier includes a destination address table having one or more entries, each one of said destination address table entries having a domain prefix and a domain identifier associated with that domain prefix.

10. The system as in claim 7 wherein said protocol determining means includes a protocol table having one or more entries, each said protocol table entry having a protocol type and port number range, a further having a protocol domain identifier associated with that protocol type and port number range, said protocol determining means further having a protocol vector, said protocol vector having a protocol index associated with each pair of said protocol domain identifiers.

11. The system as in claim 10 wherein said means for determining that a network layer source address in said received packet is in said first set of one or more network layer addresses searches said source address table for a longest domain prefix matching said network layer source address.

12. The system as in claim 10 where said means for determining that a network layer destination address in said received packet is in said second set of one or more network layer addresses searches said destination address table for a longest domain prefix matching said network layer destination address.

13. The system as in claim 7 further comprising a means for using said index into said filtering matrix to obtain a filtering matrix entry.

14. The system as in claim 13, further comprising means, responsive to said filtering matrix entry, for forwarding said received packet if said forwarding flag in said filtering matrix entry is equal to a first value.

15. The system as in claim 14, further comprising means, responsive to said filtering matrix entry, for dropping said received packet if said forwarding flag in said filtering matrix entry is equal to a second value.

16. A system for forming a packet filtering data structure, responsive to a command script, comprising:

means for forming an address table having one or more entries, each address table entry including a domain prefix and a domain identifier;

means for forming a two dimensional filtering matrix having one or more entries, each row in said filtering matrix indexed by one of said domain identifiers, and each said filtering matrix entry having a filtering flag;

means for identifying a first row in said filtering matrix, identical with a second row in said filtering matrix, said first row indexed by a first domain identifier, said second row indexed by a second domain identifier; and means for deleting said second row from said filtering matrix, and for replacing said second domain identifier in said address table with said first domain identifier.

17. A system for forming a packet filtering data structure, responsive to a command script, comprising:

means for forming an address table having one or more entries, each address table entry including a domain prefix and a domain identifier;

means for forming a protocol table having one or more entries, each protocol table entry including a protocol type, port range, and associated protocol domain identifier;

means for forming a two dimensional protocol vector having one or more entries, each entry in said protocol vector indexed by a pair of said protocol domain identifiers, each protocol vector entry including a protocol index;

means for forming a three dimensional filtering matrix having one or more entries, a first and second dimension in said filtering matrix indexed by a first and a second one of said domain identifiers, a third dimension in said filtering matrix indexed by a protocol index, and each said filtering matrix entry having a filtering flag;

means for identifying a first plane in said filtering matrix, identical with a second plane in said filtering matrix, said first plane indexed by a first protocol index, said second plane indexed by a second protocol index; and means for deleting said second plane from said filtering matrix, and for replacing said second protocol index in said protocol vector with said first protocol index.

18. A method of filtering a packet received at a device comprising the steps of:

extracting a source address and a destination address from said packet;

identifying a source domain identifier and a destination domain identifier associated with said source address and destination address, respectively;

retrieving one entry, of a plurality of entries in a filtering matrix as a function of said source and destination domain identifiers, each entry comprising a forwarding flag; and forwarding said packet if said forwarding flag in said retrieved entry is equal to a first value.

19. The method according to claim 18, wherein said domain identifier indicates a network protocol associated with said address.

* * * * *